United States Patent [19]
Schmitt

[11] Patent Number: 5,258,914
[45] Date of Patent: Nov. 2, 1993

[54] SYSTEM FOR LIMITING ENGINE TORQUE IN DEPENDENCE UPON STEERING ANGLE AND WHEEL SLIPPAGE

[75] Inventor: Johannes Schmitt, Markgröningen, Fed. Rep. of Germany

[73] Assignee: Robert Bosch GmbH, Stuttgart, Fed. Rep. of Germany

[21] Appl. No.: 663,848

[22] PCT Filed: Aug. 11, 1989

[86] PCT No.: PCT/EP89/00953

§ 371 Date: Mar. 26, 1991

§ 102(e) Date: Mar. 26, 1991

[87] PCT Pub. No.: WO90/03287

PCT Pub. Date: Apr. 5, 1990

[30] Foreign Application Priority Data

Sep. 30, 1988 [DE] Fed. Rep. of Germany ....... 3833213

[51] Int. Cl.$^5$ ............................................. B60T 8/58
[52] U.S. Cl. ............................ 364/426.03; 180/197
[58] Field of Search ................. 364/426.01, 426.02, 364/426.03; 180/197; 303/103, 109

[56] References Cited

U.S. PATENT DOCUMENTS

| | | | |
|---|---|---|---|
| 4,704,541 | 11/1987 | Leiber | 180/197 X |
| 4,763,262 | 8/1988 | Leiber | 364/426.03 |
| 4,763,263 | 8/1988 | Leiber | 364/426.03 |
| 4,779,202 | 10/1988 | Leiber | 364/426.03 |
| 4,794,538 | 12/1988 | Cao et al. | 364/426.02 |
| 4,794,539 | 12/1988 | Wallentowitz et al. | 364/426.01 |
| 4,849,891 | 7/1989 | Krohn et al. | 364/426.03 |
| 4,984,165 | 1/1991 | Müller et al. | 364/426.02 |
| 4,999,778 | 3/1991 | Ruhl et al. | 364/426.02 |

Primary Examiner—Thomas G. Black
Assistant Examiner—Collin W. Park
Attorney, Agent, or Firm—Felfe & Lynch

[57] ABSTRACT

A steering angle limit value, with which the actual steering angle is compared, is determined from the reference speed and the friction coefficient. If the limit value is exceeded and an anti-slip control is running, the reference speed is kept virtually constant in the drive slip controller. The drive slip controller therefore reduces the engine torque, and keeps the vehicle speed around the reference speed.

14 Claims, 1 Drawing Sheet

SYSTEM FOR LIMITING ENGINE TORQUE IN DEPENDENCE UPON STEERING ANGLE AND WHEEL SLIPPAGE

BACKGROUND OF THE INVENTION

The invention relates to a drive control system which limits the engine torque when the driven wheels have a tendency to spin.

U.S. Pat. No. 4,779,202, discloses such a system including a longitudinal vehicle acceleration sensor, a steering angle sensor, and a circuit for computing a reference speed corresponding to the vehicle speed. There, when a tendency to spin commences, the vehicle acceleration is measured and the associated permissible value of transverse acceleration is determined. Then the cornering limit speed is determined from the maximum permissible transverse acceleration and the steering angle. If this limit speed is reached by the vehicle, the engine torque is reduced.

SUMMARY OF THE INVENTION

According to the invention, the engine torque is reduced when a steering angle limit value dependent on the vehicle speed is reached. If the steering angle limit value is reached and there is drive slip, the reference speed is kept at least approximately constant, as a result of which the vehicle speed is fixed around the reference speed. If the steering angle limit value is not reached or there is no drive slip, the reference speed is allowed to increase to the speed of the slowest turning wheel.

As compared to the prior art, the inventive system achieves a distinct improvement in handling when negotiating corners.

DETAILED DESCRIPTION OF THE PREFERRED EMBODIMENT

Figure 1:
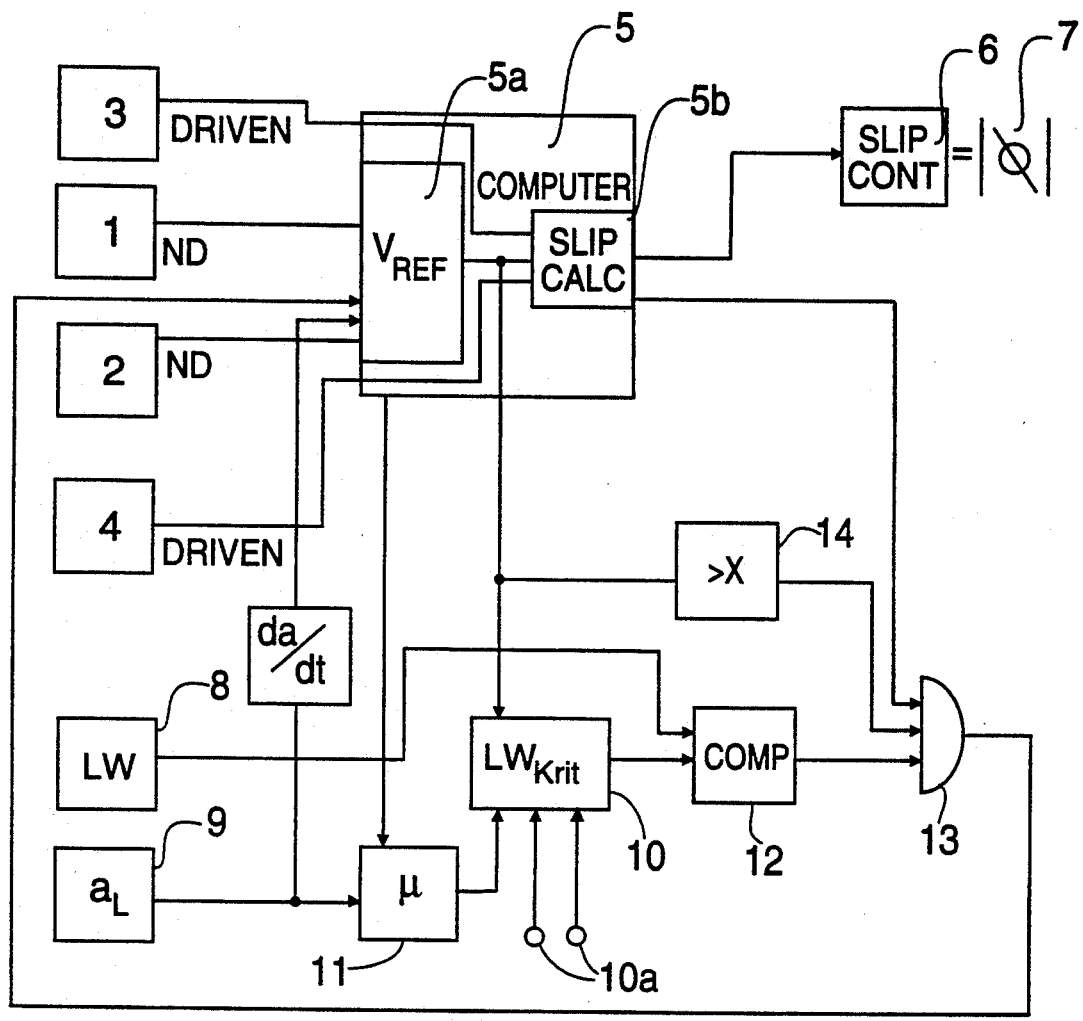
FIG. 1 is a diagram of the system.

In FIG. 1, wheel speed sensors 1 and 2 are assigned to the non-driven wheels and wheel speed sensors 3 and 4 are assigned to the driven wheels. In a sub-block 5a of the computer 5, a reference speed $V_{Ref}$ approximated to the vehicle speed is obtained from the speed signals of the non-driven wheels by averaging. This reference speed and the wheel speeds of the driven wheels are fed to a further sub-block 5b for slip control. If strong drive slip occurs, a final control element 6 is operated, which here adjusts a throttle valve 7 in the sense of a reduction of the engine torque. It is insignificant for the invention whether the brakes of the driven wheels are also included in the drive slip control.

Figure 2:
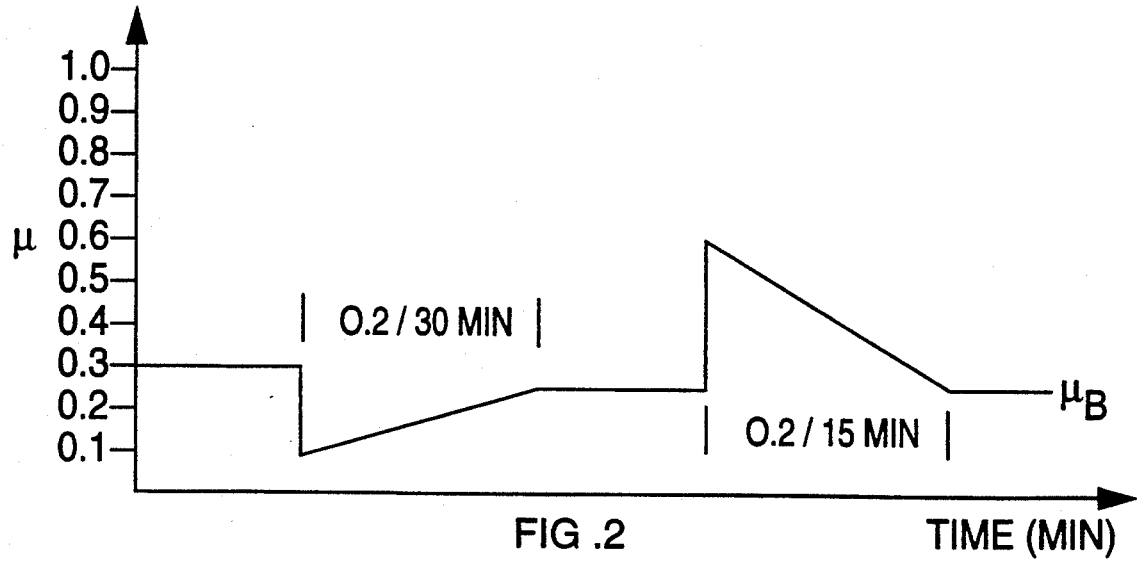
FIG. 2 is a graph of the calculated coefficient of friction, which is used to calculate the critical steering angle, versus time.

In order to improve handling on a corner, a steering angle sensor 8 is additionally provided. The steering angle limit value $LW_{Krit}$ is calculated in a computer 10. For this purpose, the computer 10 is fed the reference speed $V_{Ref}$ from the sub-block 5a and the friction coefficient $\mu$ is determined in a block 11 by the following procedure: a basic value for $\mu_B$ of, for example, 0.3 is specified. If the longitudinal vehicle acceleration $a_L$ which the longitudinal acceleration sensor 9 measures, exceeds an acceleration value which corresponds to the specified basic value $\mu_B$ or a value $\mu$ other than the latter which happens to exist at the time, the basic value or the existing value is raised by a corresponding value. In particular when a drive slip control or an anti-blocking control commences, the existing value for $\mu$ corresponding to the acceleration or retardation achieved, which the longitudinal acceleration sensor 9 measures, is raised or lowered. The new value is taken back to the basic value via a ramp with gentle slope over time. This is shown in FIG. 2. The ramp slopes vary in steepness (as shown). The approximation value for $\mu$ thus determined is fed to the computer 10, which calculates the steering angle limit value $LW_{Krit}$ according to the following relation;

$$LW_{Krit} = a\mu + b\mu/V_{Ref}^2$$

and which reads for example $$LW_{Krit} = 50 \cdot \mu + 12 \cdot 10^4 \mu / V_{Ref}^2$$

In addition, signals which are dependent on the temperature and whether the roadway is wet or dry and which vary the basic value $\mu_B$, for example according to the following table, are also entered in the computer 10 via terminals 10a

|  | Roadway | |
|---|---|---|
|  | wet | dry |
| Temp. > 3° $\mu_B$ = | 0.25 | 0.35 |
| Temp. ≤ 3° $\mu_B$ = | 0.2 | 0.3 |

The actual steering angle LW from the sensor 8 is compared with the steering angle limit value $LW_{Krit}$ in a comparator 12 and a signal is generated if the steering angle becomes greater than the limit value $LW_{Krit}$. This signal is fed to an AND gate 13, which is transmissive if additionally existing drive slip is also signalled by the sub-block 5b and the magnitude of the reference speed $V_{Ref}$ indicates that a certain speed X (for example 30 km/h) is exceeded (comparator 14).

The output signal of the AND gate 13 passes to the sub-block 5a and has the effect there that the reference speed no longer changes with the wheel speeds but is virtually fixed. In the block 5a, for this purpose the slope of the reference speed $V_{Ref}$ is dimensioned for example as follows:

$$\dot{V}_{Ref} = cg - dg\{\max(\dot{V}_S - \dot{V}_L) \text{ and } (\dot{V}_S - \overset{*}{a}_L)\}$$

for example $$\dot{V}_{Ref} = 015\,g - 0.1\,g\,\{\max(\dot{V}_S - \dot{V}_L) \text{ and } (\dot{V}_S - \overset{*}{a}_L)\}$$

where: c and d are constants, g is the gravitation constant, $V_S$ and $V_L$ the speed of the fastest wheel and slowest wheel, respectively, and $a_L^*$ the vehicle acceleration corrected by the angle of inclination.

Due to the virtual keeping-constant of the reference speed, the drive slip controller 5b adjusts the vehicle speed to approximately this speed. If the output signal of the AND gate 13 disappears, the reference speed increases with a specified high slope, which may for example correspond to the maximum possible gear-dependent acceleration, to the speed of the slowest turning wheel.

I claim:

1. A drive control system for a vehicle having an engine which produces torque and wheels including at least one driven wheel, at least one fastest wheel, and at least one slowest wheel, said system comprising means for determining speeds of the wheels, means for generating a reference speed which corresponds to the vehicle speed, said reference speed having a slope, means for determining slippage of the driven wheels based on said reference speed, means for limiting engine torque in response to said slippage of said driven wheels, thereby limiting said slippage, means for measuring the longitudinal acceleration $a_L$ of the vehicle and generating a longitudinal acceleration signal, means for measuring the steering angle and generating a steering angle signal, means for generating a steering angle limit value which is dependent on the vehicle reference speed and upon the longitudinal acceleration signal, means for limiting the reference speed so that the slope of the reference speed is limited to a defined slope when the steering angle reaches the limit value and slippage of a driven wheel takes place, and for increasing the reference speed to the speed of slowest wheel when the steering angle falls below the limit value or when there is no longer slippage of a driven wheel.

2. Drive control system as in claim 1 wherein an approximate friction coefficient $\mu$ is a factor in a determination of the steering angle limit value $LW_{Krit}$.

3. Drive control system as in claim 2 wherein the steering angle limit value is calculated according to the formula $$LW_{Krit} = \mu \left( a + \frac{b}{V_{Ref}^2} \right)$$

a and b being constants and $V_{Ref}$ being the reference speed.

4. Drive control system as in claim 2 wherein the friction coefficient is determined by a learning condition, starting from a basic value which is increased correspondingly if longitudinal acceleration signals indicating a higher friction coefficient occur and is taken back to the basic value with a defined slope.

5. Drive control system as in claim 4 wherein, when at least one of a drive slip control and an anti-blocking control commences, the basic value is increased or decreased corresponding to the existing longitudinal acceleration signal.

6. Drive control system as in claim 4 further comprising means for measuring the outside temperature and means for measuring the wetness of the roadway, said basic value being dependent upon the outside temperature and the wetness of the roadway.

7. Drive control system as in claim 1 wherein the limiting of the slope of the vehicle speed takes place only if a specified limit value of the vehicle speed is exceeded.

8. Drive control system as in claim 1 adapted for use on vehicles with all-wheel drive.

9. Drive control system as in claim 1 wherein said means for limiting the reference speed keeps the reference speed constant when the steering angle reaches the limit value and slippage of a driven wheel takes place.

10. Drive control system as in claim 9 further comprising means for determining the slope $\dot{V}_s$ of the speed of the fastest wheel and the slope $\dot{V}_L$ of the speed of the slowest wheel, said defined slope being dependent upon the maximum of $(\dot{V}_s - \dot{V}_L)$ and $(\dot{V}_s - a_L)$.

11. A drive control system as in claim 1 wherein said means for limiting the reference speed reduces the engine torque.

12. Drive slip control system for a vehicle having driven wheels, non-driven wheels, and an engine which produces torque, said system comprising means for determining the speeds of the driven and non-driven wheels, including a fastest wheel and a slowest wheel, a reference speed generator which produces a reference speed corresponding to the vehicle speed, said reference speed having a slope, means for determining when slippage of the driven wheels occurs based on the speeds of the driven wheels and the reference speed, means for limiting engine torque in response to said slippage of said driven wheels, thereby limiting said slippage, a longitudinal vehicle acceleration sensor which produces a longitudinal acceleration signal $a_L$, a steering angle sensor which produces a steering angle signal, means for producing a steering angle limit value dependent upon the reference speed and upon the acceleration signal, means for comparing the steering angle signal to the steering angle limit value, and means for limiting the reference speed so that the slope of the reference speed is limited to a defined slope when said slippage occurs and the steering angle exceeds the steering angle limit value, and for correcting the reference speed to the speed of the slowest wheel when at least one of said slippage and the said steering angle exceeding the limit value no longer occurs.

13. Drive slip control system as in claim 12 further comprising means for determining the angle of inclination, and means for correcting the longitudinal acceleration signal $a_L$ by said angle of inclination to produce a corrected signal $\overset{*}{a}_L$.

14. Drive slip control system as in claim 13 further comprising means for determining the slope $\dot{V}_s$ of the speed of the fastest wheel and the slope $\dot{V}_L$ of the speed of the slowest wheel, said defined slope being dependent upon the maximum of $(\dot{V}_s - \dot{V}_L)$ and $(\dot{V}_s - \overset{*}{a}_L)$.

* * * * *